June 30, 1953  J. B. POWERS ET AL  2,643,955
METHOD OF AND APPARATUS FOR FLAME SPRAYING
POLYETHYLENE AND OTHER PLASTICS
Filed Aug. 26, 1950  2 Sheets-Sheet 2
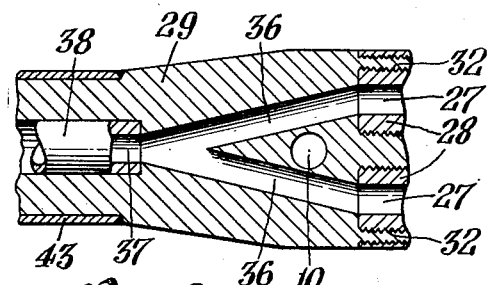
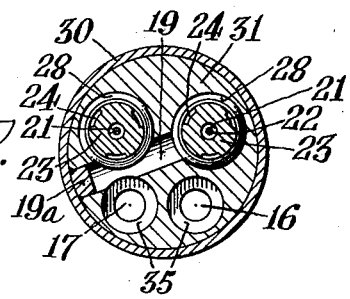
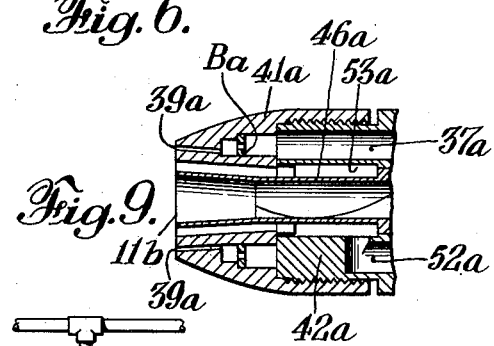
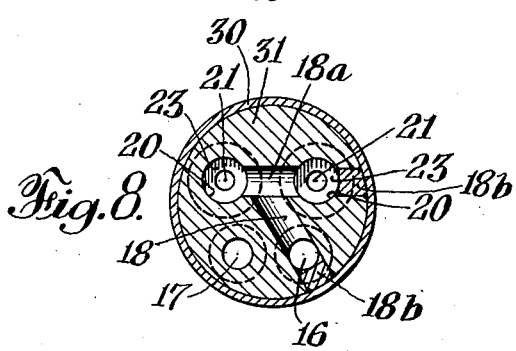
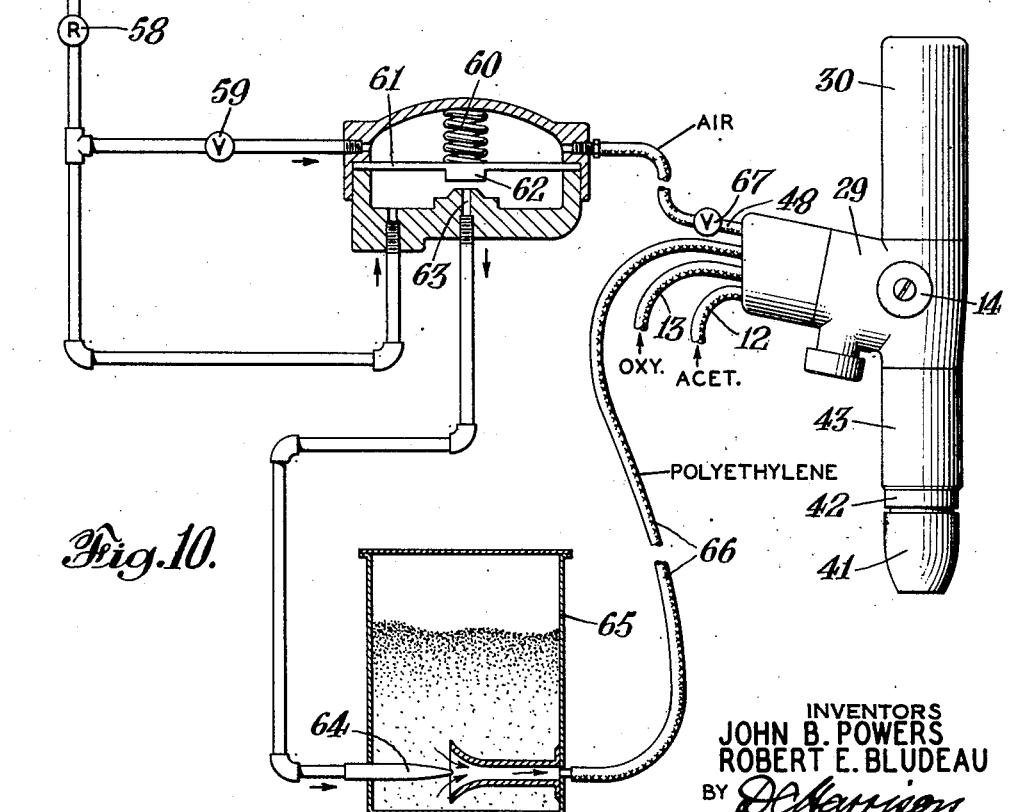
INVENTORS
JOHN B. POWERS
ROBERT E. BLUDEAU
BY
ATTORNEY

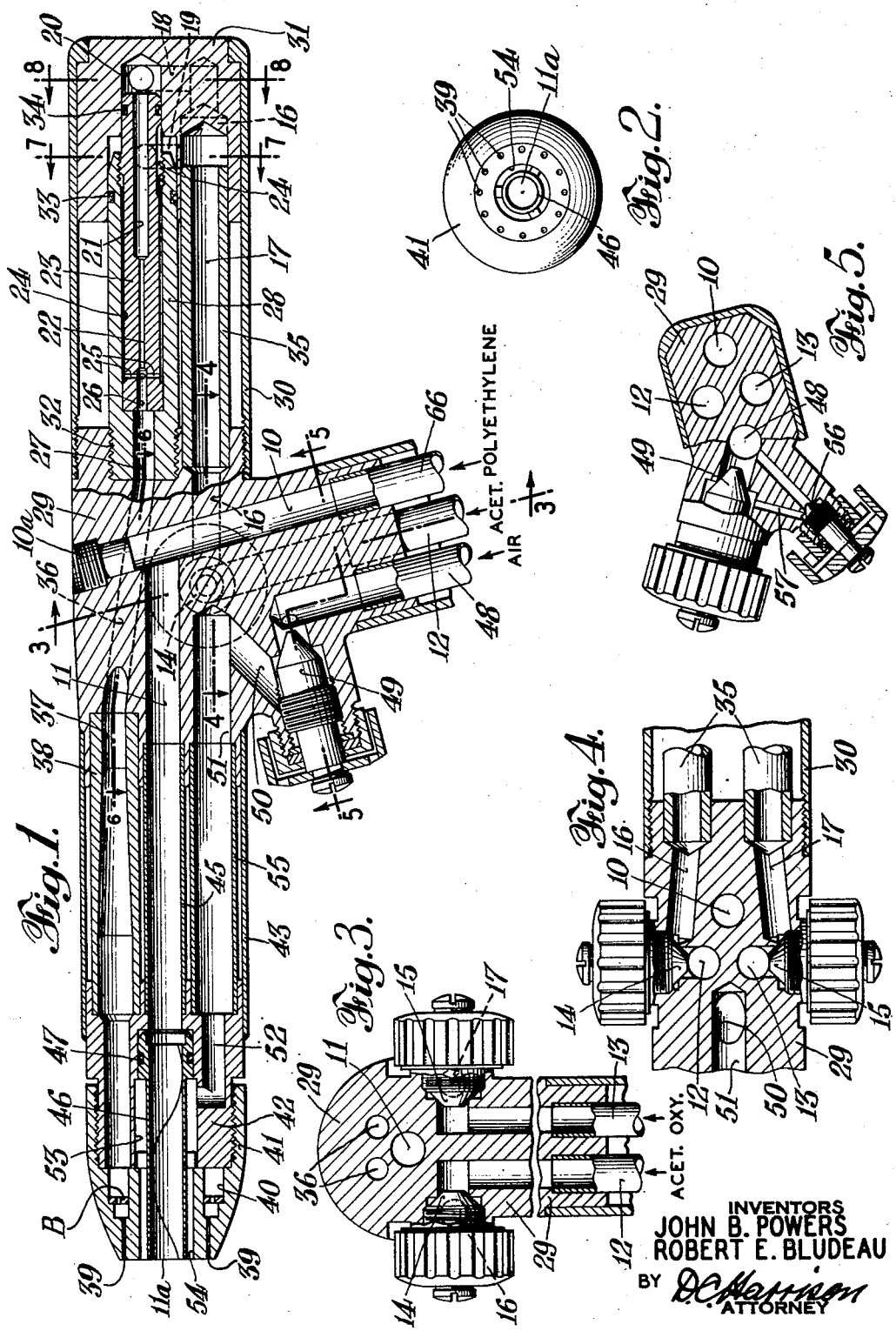

UNITED STATES PATENT OFFICE 2,643,955

METHOD OF AND APPARATUS FOR FLAME SPRAYING POLYETHYLENE AND OTHER PLASTICS

John B. Powers, Newark, and Robert E. Bludeau, Denville, N. J., assignors, by mesne assignments, to Union Carbide and Carbon Corporation, a corporation of New York Application August 26, 1950, Serial No. 181,666

16 Claims. (Cl. 117—21)

When polymerized ethylene became commercial it was recognized as being well suited for lining tanks where corrosion resistance was important. It could not be satisfactorily applied commercially with the aid of a solvent because of its difficult solubility. To obtain a continuous coat from stable emulsions, baking was necessary. Several processes for flame spraying polyethylene are known but none of them is satisfactory. One objection is the relatively low output, making the cost high. A low output has been necessary, because, with higher outputs, hotter flames have been needed, and hotter flames entail objectionable decomposition of the material and premature fusion of it in the gun barrel, clogging the barrel and making frequent stoppages necessary for cleaning. It is believed that a large cause of the difficulty has been due to overheating the powder particles during their flight through the air, causing decomposition. The thermal insulating character of polyethylene has made it difficult to uniformly heat the particles without overheating the surface. Another difficulty has been poor adhesion of the coating to the foundation.

One process in use for a few years has been able to flame spray in the neighborhood of 20 square feet per hour for a polyethylene coating about .03" thick. That process contemplated the mixing of polyethylene with an antioxidant in as large amount as 50%, which detracted from the characteristics desired for the mixture. One reason for the antioxidant was to enhance adhesion of the coat to its foundation. A low temperataure oxy-propane flame was used in that process in an effort to reduce the likelihood of overheating the material in the gun, but such flame spraying efforts were unfruitful. The material did become fused and adhere in the bore of a gun.

Another process has used a relatively cool flame due to the burning of city gas and air, and covering about 12 to 15 square feet per hour with the same thickness of polyethylene. This second process heated the metal foundation being coated to 425° F. and added a small amount of carbon black to the polyethylene to enhance the adhesion of the coating being applied to the metal.

The present invention relates to the flame spraying of polyethylene and other thermoplastics, and has for an object to increase greatly the output of a flame spray gun using polyethylene. Another object is to avoid the necessity of frequent interruptions for cleaning the deposited material from the gun. Still another object is to spray thermoplastics without danger of objectionable decomposition of the material. A further object is to provide a process for spraying polyethylene and other thermoplastics onto a metal foundation with satisfactory adhesion of the sprayed coat to the foundation. Yet a further object is to provide a spray gun which is adapted to the foregoing objects and which is provided with a cooling passage to preclude the plastic melting prematurely in the gun.

According to the present invention, it has been possible to coat better than 100 square feet per hour with polyethylene of the thickness indicated when sprayed by a hand type flame spray gun. This has been accomplished by carrying polyethylene powder in an air stream and surrounding the powder and air mixture by a separate stream of cooling air for shielding the powder from the heat of a high temperature flame such as that resulting from burning a premixed oxy-acetylene fuel. The cooling air stream prevents overheating and decomposition of the powder. At least most of the heating of the powder takes place after its flight, and its fusion is believed to occur principally at the foundation being coated, although, by adjusting the quantity of cooling air so as to use less of it, the powder can be heated earlier and to a greater extent. In practice, the foundation to be coated with polyethylene is preferably preheated to about 425° F. and placed about 6" to 20" from the muzzle of the hand spray gun used.

The process and apparatus of this invention have been found capable of use with only those thermoplastics which are in a fluid state at least 50° F. below their respective decomposition temperatures. With those thermoplastics having less than 50° F. difference in said temperatures, substantial decomposition takes place before a continuous film is formed. All true thermoplastics having the above characteristics are believed appropriate for use with this invention. Many widely different types of thermoplastics have been used and found satisfactory. As to polyethylene, the particles formed by chilling the material and powdering it in an impact mill seem to have a superior adherence to the particles of the same material formed by powdering it without the use of the sub-brittle-point refrigerant. Powder particles of polyethylene formed by the cold treatment process have sharp edges, whereas such particles formed by other processes seem to have either a rounded shape or else a skeletal or branched structure.

Referring to the drawings:

Fig. 1 is a longitudinal cross section through a flame spray gun adapted for use with the process of this invention.

Fig. 2 is a left-hand view of the device of Fig. 1 showing the muzzle from the outside.

Fig. 3 is a section on the line 3—3 of Fig. 1.
Fig. 4 is a section on the line 4—4 of Fig. 1.
Fig. 5 is a section on the line 5—5 of Fig. 1.
Fig. 6 is a section on the line 6—6 of Fig. 1.
Fig. 7 is a section on the line 7—7 of Fig. 1.
Fig. 8 is a section on the line 8—8 of Fig. 1.
Fig. 9 shows the forward end of a gun having a slightly modified construction.

Fig. 10 shows the apparatus for controlling the quantity of powdered plastic being supplied to the spray gun.

Powder particles carried in an air stream are supplied to the gun through the passage 10 and within the gun the powder and air stream moves through the passage 11 to the muzzle orifice 11a, from which it is discharged. As shown in Fig. 3, oxygen is supplied through the line 13 and a fuel gas, such as acetylene, is supplied through the line 12. The valves 15 and 14 control the flow of oxygen and acetylene, respectively, to the gun, where they are subsequently mixed before reaching the flame nozzle orifice. After passing valves 15 and 14, the oxygen moves rearwardly through the passage 17 and the fuel gas through the passage 16 to the rear portion of the gun. As shown in Fig. 8, an inclined passage 18 leads from the rear end of the fuel passage 16 to a transverse passage 18a for supplying the mixing means. Plugs 18b close the ends of the passages 18 and 18a. As shown in Fig. 7, an inclined passage 19 connects the oxygen supply passage 17 with spaces around both mixing devices. Plug 19a closes the end of the inclined passage 19.

Fuel is supplied to the rear ends 20 of both passages 21 in the tubes 23, the forward portions of the fuel passages being of reduced diameter at 22. Oxygen is supplied from the inclined passage 19 to the several grooves 24 in each of the tubes 23, the oxygen passing to the forward end of the tubes and thence drawn through the transverse passages 25 for mixing with fuel in the passage 26 forward of the transverse passages 25. The fuel gas mixture then enters the bore 27 of each of the tubes 28, as shown in Figs. 1 and 6, from which it moves forward. The tubes 28 have a threaded connection 32 with the body 29 of the gun, as shown in Figs. 1 and 6. A tube 30 threaded onto the body of the gun supports the plug 31 in the rear end portion, as shown. O rings or other appropriate packing rings 33 and 34 are provided at the rear ends of the tubes 28 and 23, respectively, the tube 23 being threaded within the tube 28, as illustrated, to form a gas tight seat. The tubes 35 carry the oxygen and fuel gas passages 17 and 16, as shown in Figs. 1 and 4.

From the forward ends of the tubes 28, the fuel gas mixture moves through the converging passages 36 into the fuel mixture passage 37 in the tube 38 and is discharged at the orifices 39 at the muzzle of the gun. A peripheral fuel gas chamber 40 supplies the flame orifices, which are spaced around the muzzle of the gun, as shown in Fig. 2. The head portion 41 is threaded onto the plug 42, which fits over the fuel mixture tube 38. A cover tube 43 surrounds the several supply tubes connecting the main body with the forward portion of the gun. The baffle plate B is provided to insure a fairly uniform distribution of gas to the several orifices 39.

A tube 45 connects the plug 42 with the main body 29 for carrying the air borne powder. Another tube 46 carries the air and powder mixture to the muzzle orifice 11a and is provided with O ring or other packing 47.

Cooling air is supplied through the line 48, moves past the valve 49, thence up the inclined passage 50 and then forwardly through the passage 51, thence through the tube 55, passage 52, into the peripheral cooling chamber 53 around the tube 46, from which the cooling air discharges at the nozzle orifice 54. Valve 49 is preferably of the quick opening type. In parallel with valve 49 is the valve 56, the function of which is to adjust or control the flow of cooling air for the purpose of controlling the quantity of powder moving through the passages 10 and 11. An outlet passage 57 from the valve 56 leads into the passage 50.

As shown in Fig. 10, air is delivered from the regulator 58 at a substantially constant pressure, part being supplied through the throttle valve 59 to the upper side of the diaphragm 61 having a spring 60 for urging the valve 62 into closed position when the air pressure above the diaphragm is below a predetermined amount. Another part of the air from the regulator is supplied to the lower side of the diaphragm 61. When the valve 62 is open, air is delivered into the outlet passage 63 leading to the injector 64 in the powder storage container 65 for blowing air through the outlet pipe 66 to the spray gun. A throttle valve 67 is shown in the line between the spray gun and the air pressure above the diaphragm 61. The valve 67 is constituted by the unit comprised of the two valves in parallel, shown in Fig. 5. As the valve 59 is partially closed, the pressure above the diaphragm decreases until the valve 62 opens and powder is supplied to the spray gun. On throttling the valve 56, air pressure is built up above the diaphragm to reduce the air supplied to the injector 64 and reduce the powder supplied to the gun. It will be understood that the powder and air mixture in the pipe 66 is connected to the pipe 10, shown in Fig. 1.

In operation, the valve 59 is opened sufficiently to close the valve 62 after the valve 49 of the unit 67 has been opened. With cooling air thus being supplied to the gun, the valves not shown controlling the supply of oxygen and fuel gas to the gun are next opened to the desired amount and the combustible mixture ignited at the nozzle orifices 39. The supply of gases is adjusted to provide a neutral flame when the cooling air issuing from the orifice 54 precludes the gun from being overheated. Further throttling the valve 59 reduces the air supplied above the diaphragm 61, causing the valve 62 to open and powder to be supplied to the passages 10 and 11. Throttling the valve 56 causes the pressure above the diaphragm 61 to be built up, partially closing the valve 62, reducing the air supplied to the injector 64, and reducing the quantity of powder supplied to the gun.

When the metal foundation to be coated has been heated to about 425° F., and with the spray gun some convenient distance away, such as 6" to 20", about 300 cubic feet per hour of fuel mixture has been found desirable with a 1 to 1 ratio of oxygen to acetylene. About 500 cubic feet per hour under 30 pounds per square inch pressure of cooling air is delivered to the annular orifice 54 for obtaining satisfactory operation. About 100 to 200 cubic feet per hour of air under 5 to 20 pounds per square inch pressure supplied to the injector 64 has been found satisfactory for feeding 15 pounds of powder per hour to the gun. The most satisfactory powder size is that which will pass through a 50-mesh screen (one having openings .0116 inch) and be retained by a 100-mesh screen (openings .0058 inch). Too fine a powder, say, 200-mesh, tends to decompose on contact with the hot gases of combustion resulting in undesirable properties of the applied coating. Too large a particle, 20-mesh, requires a longer time of contact with the hot gases to fuse them into a continuous film. The rate of application is, therefore, slower. The cooling air stream from the orifice 54 is usually at a higher velocity than the powder and air mixture being ejected from the gun and serves to shield the powder against the intense heat of the oxy-acetylene flame. Combustion of the fuel gas is substantially completed at a short distance from the muzzle of the gun and the mixing of the products of combustion with the cooling air and powder to heat the powder to substantially its fusion temperature occurs at a substantial distance from the gun. This does not necessarily imply the fusion of the powder in flight; the greater portion of fusion occurs on the foundation. Polyethylene having a fusion temperature of 221° F. was the sort found desirable. Polyethylene having a molecular weight of value to give this fusion temperature was found to decompose at about 530° F. The application of polyethylene of higher or lower fusion temperature than the above may be accomplished by proper control of the cooling air volume. The use in the present gun of lower molecular polyethylenes is limited to those that are capable of being conveyed as a powder at ambient temperature. By regulating the quantity of cooling air, the quantity of powder supply, and the quantity of fuel gas mixture, it was found possible to heat the powder to its fusion temperature without substantial decomposition.

Fig. 9 shows the forepart of a gun of modified construction to attain increased coverage by use of the diverging passages illustrated for the powder, cooling air and flame. With the exception of the central passage 11b the reference numerals in Fig. 9 designate corresponding parts in Fig. 1 except that in Fig. 9 the exponent a has been added. Helical ribs or rifling in the powder passage 11 are useful especially for the slower speeds of powder in both the embodiments of Figs. 1 and 9.

Polyethylene is one of the plastics for which this invention is especially adapted because of its substantial insolubility in the usual cheaper commercial solvents customary for many other resinous coatings. However, the process and apparatus of this invention are useful in applying many other coatings, such as a plastic of methyl methacrylate polymer having a molecular weight of about 600,000, polyvinyl butyral resins and mixtures of these with each other and with polyethylene. Other resins also successfully flame sprayed under essentially the same conditions as mentioned above for polyethylene are polysulfide rubbers known as Thiokol 1001, polystyrene and ethyl cellulose. In short, all resinous true thermoplastics capable of being fused by a flame spray gun and having a fluid temperature sufficiently below the decomposition temperature to allow the formation of a continuous film without appreciable decomposition are capable of being flame sprayed by this process and apparatus. It has been found that with the apparatus described it is difficult to prevent variations in the temperature of the foundation of less than plus and minus 25° F. when such foundation is heated to 425° F. Therefore, at least a 50° F. difference is necessary between the temperature at which the thermoplastic being sprayed decomposes and the temperature at which it softens. This is corroborated by a vinyl chloride (95+%) and vinyl acetate (5−%) copolymer which had less than said difference between its softening and decomposition temperatures. Such vinyl chloride and vinyl acetate copolymer could not be flame sprayed satisfactorily until it had been plasticized to an extent lowering its liquid temperature to as much as 50° F. below its decomposing temperature of 400° F. Such plasticized vinyl resins have been flame sprayed to give a continuous film with no appreciable decomposition. Plasticizing effects a lower softening temperature without a corresponding reduction in the decomposition temperature. The ability to form a continuous film does not imply that the coating is necessarily satisfactory in terms of adhesion to the foundation. Thermoplastics which gave a good bond to a metal foundation when coated by this flame spray gun include polyethylene having a fusion temperature of 221° F. and especially that powdered by cold treatment far below its brittle temperature, polyvinyl butyral having a plastic range beginning at 320° F. and a decomposition temperature of 428° F., and polysulfide rubber known as Thiokol 1001 which has a plastic range beginning at 230° F. and a decomposition temperature of 491° F.

Among the advantages of this invention may be mentioned the fact that about 100 square feet per hour of $\frac{1}{16}$ inch thick plate may be coated with a thickness of .03″, with a consumption of 300 cubic feet per hour of mixed gas which is about 250% better than was obtainable prior to this invention for flame spraying polyethylene, and which is about 500% better than the prior processes mentioned. There is no fusion and adherence of powder in the gun barrel and no frequent cleaning is necessary. A satisfactory coating is obtained possessing good adherence of the plastic to the foundation being coated. The cooling air stream between the flame and powder protects the powder against overheating and decomposing. The polyethylene of the kind which has been powdered by spraying liquid nitrogen on the material just prior to its entry into an impact mill was found to provide the most satisfactory coating. The reason for the superiority of polyethylene powder made by this process is not known, but may be due to the structure of the particles brought about by the pulverizing process. The conclusion of Messrs W. B. De Long and E. V. Peterson in the June 1949 issue of Chemical Engineering, page 124, that the particles of polyethylene are undoubtedly raised to their fusion temperature after reaching the foundation rather than in flight, is in agreement with the results observed in the present process. In other words, the probability of the particles reaching their fusion temperature only after reaching the foundation seems much greater in the present process where the particles are shielded from the flame by the cooling air stream than in the De Long and Peterson process where the particles were not thus shielded even though they used a lower temperature flame. The gun in this invention may be used to heat the foundation being coated by shutting off the powder stream and reducing the flow or quantity of cooling air. The gun illustrated delivers a premixed flame, i. e., one in which the fuel and oxidizing gases are mixed before reaching the muzzle.

What is claimed is:

1. In a process of spraying from a gun upon a foundation a thermoplastic material having a softening temperature at least as much as 50° F. below its decomposition temperature, said process comprising burning a premixed fuel and oxidizing gas directed at said foundation and giving substantially as hot a flame as a premixed one of oxy-acetylene, and ejecting said thermoplastic material also toward said foundation but at a location spaced from the burning fuel, the combination therewith of the improvement for reducing the danger of overheating said thermoplastic, said improvement comprising ejecting a stream of non-combustible cooling gas between the stream of thermoplastic material and the burning fuel stream until combustion of the fuel is substantially complete, said cooling gas completely separating the ejected stream of thermoplastic material from said flame and shielding said thermoplastic material from the heat of the burning flame for a substantial distance in the portion of the flight of the material during which combustion of the fuel is largely taking place and then mixing the material stream, and the products of combustion.

2. In a process of flame spraying polyethylene powder from a gun upon a foundation when the polyethylene has a size which will pass through a screen of 50-mesh and not through a screen of 100-mesh, comprising burning fuel in the presence of an oxidizing gas when both the fuel and oxidizing gas are discharged from the gun, and ejecting powder from the gun at a location spaced from that at which the fuel is burning, but in the same general direction as the burning fuel so that the heat of fuel combustion softens the powder particles, the combination therewith of the improvement for avoiding overheating of the powder and for cooling the gun, said improvement including ejecting a stream of non-combustible cooling gas between the issuing powder and the burning fuel at a velocity to maintain separation of the powder and burning fuel until combustion of the fuel is substantially complete, said cooling gas completely separating the ejected stream of thermoplastic material from said flame and shielding and subsequently mixing the cooling gas and products of combustion to heat the powder.

3. In a process of flame spraying from a gun upon a metal foundation a finely divided thermal insulating thermoplastic having a softening temperature above normal room temperature and a fusion temperature at least as much as 50° F. below its decomposition temperature, said process comprising preheating said foundation from said gun to assist in bonding the thermoplastic particles, and then ejecting powder from the gun at a location spaced from but in the same general direction as the movement of burning fuel, the combination therewith of the improvement for increasing the rapidity with which a foundation may be preheated and powder sprayed with the flame from the gun without danger of overheating the gun and the powder, said improvement including heating at least some of the foundation surface to be coated with a premixed flame from a spray gun, and then ejecting a stream of powdered thermoplastic from the same gun with a stream of non-combustible cooling gas between the issuing powder and the burning premixed fuel, the stream of cooling gas completely separating the ejected stream of thermoplastic powder for a substantial distance and shielding the said powder from said premixed flame deleteriously heating the main body of said powder in the portion of its flight during which combustion of the fuel largely takes place and said cooling gas being at a velocity and in quantity to maintain separation of the powder and burning fuel until after combustion of the fuel is largely complete but to allow subsequent mixing of the cooling gas and products of combustion to heat the powder.

4. A process according to claim 3 in which the cooling stream of gas is at a higher velocity than the powder issuing from said gun.

5. A process according to claim 3 in which said fuel is an oxyacetylene mixture.

6. A process according to claim 3 in which said thermoplastic is from a class consisting of polyethylene, polyvinyl butyral, and polysulfide rubber.

7. A process according to claim 3 in which the thermoplastic is polyethylene in the form of particles of powder between 50 and 100 mesh in size and which have been formed by breaking up larger particles in an impact mill with the aid of a low temperature refrigerant such as liquid nitrogen and have sharp edges rather than being rounded, or of branched structure.

8. A process according to claim 3 in which the stream of cooling gas is reduced in quantity during preheating and while the powder stream is shut off.

9. A process according to claim 3 in which the thermoplastic is polyethylene.

10. A process according to claim 9 in which the powdered polyethylene is of a size between 50 mesh and 100 mesh.

11. A process according to claim 9 in which the preheated foundation is at a temperature below the deleterious decomposition temperature of the thermoplastic but high enough to assist in bonding the fused thermoplastic to the foundation during the coating portion of the process.

12. A process according to claim 11 in which the foundation is at a temperature of about 425° F.

13. In a process of flame spraying from a gun upon a foundation a finely divided thermoplastic powder having a softening temperature above normal room temperature and a fusion temperature at least as much as 50° below its decomposition temperature, said process comprising preheating at least some of said foundation to assist in bonding the fused thermoplastic powder from said gun, and then ejecting powder from the gun at a central port in the muzzle in the same general direction as the movement of burning fuel, the combination therewith of the improvement for increasing the rapidity with which the foundation may be preheated and powder sprayed from the gun without danger of overheating the gun and issuing powder, said improvement including heating at least some of the foundation surface to be coated with a premixed flame from a spray gun, and then ejecting a stream of said powdered thermoplastic from the same gun with a stream of cooling gas radially between the issuing powder and the premixed fuel flame, said stream of cooling gas completely surrounding the projected stream of thermoplastic powder for a substantial distance while the premixed fuel burns but does not deleteriously heat the powder, said cooling gas being at a velocity and in quantity to maintain the shielding of the powder from the heat of the burning fuel during at least most of the flight of the powder but to allow subsequent mixing of products of combustion and cooling gas to fuse the powder at a temperature below the deleterious decomposition temperature for the powder.

14. In a flame spray gun having a passage for powder particles of material to be sprayed, and a radially outer passage into which two separate passages in the gun merge well back from the muzzle whereby in said outer passage oxidizing and fuel gases are mixed well before reaching the muzzle, the combination therewith of the improvement enabling a thermoplastic having a softening temperature above normal room temperature and a decomposing temperature more than 50° F. above its fluid temperature to be sprayed without clogging the gun and without excessive decomposition, said improvement including a passage for discharging a cooling gas between particles of material in flight from the gun and a zone of burning fuel discharged from the gun, whereby said particles of powder may be shielded from the heat of combustion before, during, and after the particles reach their nearest proximity to the burning fuel and said particles later may be mixed with cooled products of combustion.

15. In a flame spray gun having a central passage for gas borne powder, at least one flame port, separate supply passages for fuel gas and oxidizing gas to said flame port, and a passage for discharge of a stream of cooling gas, the combination therewith of the improvement whereby an increase in the rate of application of powder to a foundation is possible by more rapid heat transfer during preheating without at the same time endangering thermoplastic powder from being overheated and decomposed, said improvement including said flame port being radially outside and around the muzzle end of said central passage, a chamber for mixing fuel and oxidizing gases from said separate supply passages longitudinally between their separate supply passages and said flame port, and said cooling stream passage discharging a shield of cooling medium substantially completely surrounding said central passage between said flame port and central passage to protect the powder being discharged from being overheated by the issuing flame.

16. A flame spray gun according to claim 15 in which valve means are provided on said gun for shutting off the flow of powder during preheating and for reducing in quantity the flow of the cooling stream.

JOHN B. POWERS.
ROBERT E. BLUDEAU.

References Cited in the file of this patent

UNITED STATES PATENTS

| Number | Name | Date |
|---|---|---|
| 1,756,381 | Pahl | Apr. 29, 1930 |
| 2,108,998 | Schoi | Feb. 22, 1938 |
| 2,410,225 | Macht | Oct. 29, 1946 |
| 2,521,179 | Mitchell | Sept. 5, 1950 |

OTHER REFERENCES

Plastic Institute Transactions, October 1948, pp. 13 to 23.